(12) United States Patent
Aggarwal et al.

(10) Patent No.: US 10,320,862 B2
(45) Date of Patent: Jun. 11, 2019

(54) PROVIDING CONTENT ANALYTICS ON DELIVERY RATE AND CONSUMPTION RATES DIFFERENTIALS IN LIVE ONLINE CONFERENCING

(71) Applicant: Adobe Inc., San Jose, CA (US)

(72) Inventors: Anurag Aggarwal, Noida (IN); Ajay Jain, Ghaziabad (IN)

(73) Assignee: Adobe Inc., San Jose, CA (US)

(*) Notice: Subject to any disclaimer, the term of this patent is extended or adjusted under 35 U.S.C. 154(b) by 491 days.

(21) Appl. No.: 14/938,245

(22) Filed: Nov. 11, 2015

(65) Prior Publication Data

US 2017/0131850 A1 May 11, 2017

(51) Int. Cl.
G06F 3/048 (2013.01)
H04L 29/06 (2006.01)
H04N 7/15 (2006.01)

(52) U.S. Cl.
CPC ........ *H04L 65/403* (2013.01); *H04L 65/1083* (2013.01); *H04N 7/15* (2013.01); *H04N 7/155* (2013.01)

(58) Field of Classification Search
CPC .................................................. H04L 12/1822
See application file for complete search history.

(56) References Cited

U.S. PATENT DOCUMENTS

2004/0113935 A1* 6/2004 O'Neal .................. G01N 30/56
 715/732
2011/0267419 A1* 11/2011 Quinn ...................... H04N 7/15
 348/14.08

OTHER PUBLICATIONS

Adobe Connect, Power User Features in Adobe Connect. Feb. 25, 2014, https://www.youtube.com/watch?v=w92S-21OW6Q.*

* cited by examiner

*Primary Examiner* — Matthew Ell
*Assistant Examiner* — Mohamed Abou El Seoud
(74) *Attorney, Agent, or Firm* — Kilpatrick Townsend & Stockton LLP (57) ABSTRACT

Disclosed are various embodiments for providing a live online conference through a computer network to participant user interfaces, wherein feedback is provided to a presenter user interface based on participants revisiting prior section content of the online conference during the live online conference. In one implementation, the participant user interface receives instructions causing the participant user interface to revisit prior section content of the live online conference during the live online conference. The instructions causing participant user interfaces to revisit prior section content during the live online conference are monitored. Based on the monitoring of the instructions, a computer determines a revisiting statistic regarding the participant user interfaces revisiting the prior section content. Feedback based on the revisiting statistic is then provided to the presenter user interface. In one implementation, the prior section content and the live online conference content are displayed simultaneously in the participant user interface.

18 Claims, 6 Drawing Sheets

PROVIDING CONTENT ANALYTICS ON DELIVERY RATE AND CONSUMPTION RATES DIFFERENTIALS IN LIVE ONLINE CONFERENCING

TECHNICAL FIELD

This disclosure relates generally to computer-implemented methods and systems and more particularly to providing content analytics on delivery rate and consumption rates differentials in live online conferencing.

BACKGROUND

During a live online conference, such as a live webinar or a live online training session, a presenter can present to participants having varying consumption rates, i.e., the rate at which a participant is able to consume and understand the information presented during the online conference. The participants' consumption rates vary based on a variety of factors, such as the level of knowledge of the subject matter for each participant, the amount of preparation the participant did prior to the conference, and the language of the presentation.

Existing online conferencing applications do not provide feedback based on the participants' consumption rate for a presenter during the live online conference to inform the presenter if his or her delivery rate is appropriate or if a particular section of the online presentation is difficult for participants to understand. With existing online conferencing applications, a presenter will not receive feedback on the conference, if at all, until after the online conference is complete. During the conference, a presenter will not know what specific content or section of the presentation the participants are finding difficult or the percentage of participants finding the particular content or section difficult. If a presenter's delivery rate is too fast for a significant number of participants or if a significant number of participants did not understand a section of the conference, the effectiveness of the online conference is reduced. Additionally, existing live online conferencing applications do not allow users to revisit prior sections of the live online conference while still playing the live portion of the online conference. Presenters in a live online conference need a way to know dynamically during the conference if changes are required to their presentation in order be more in line with the participants' rate of consumption. The lack of dynamic feedback during the online conference does not allow for a presenter make informed decisions regarding adjusting his or her presentation in order to more closely correlate with the participants' rate of consumption.

SUMMARY

Various aspects of the present invention relate to providing a live online conference through a computer network to participant user interfaces, wherein feedback based on participants revisiting prior section content of the online conference is provided to a presenter user interface during the live online conference. In one implementation, a participant user interface is provided to participants in order for the participants to receive live online conference content. During the live online conference, the participants can provide instructions to the participant user interface causing the participant user interface to revisit prior section content of the live online conference during the live online conference. In one implementation, the prior section content and live online conference content are displayed simultaneously in the participant user interface.

In various implementations, the instructions causing participant user interfaces to revisit prior section content during the live online conference are monitored. Based on the monitoring of the instructions, a computer determines a revisiting statistic regarding the participant user interfaces revisiting the prior section content. Feedback based on the revisiting statistic is then provided to the presenter user interface. In some implementations, the feedback is a visual display of the revisiting statistic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Described herein are methods and systems providing a live online conference participant user interface providing live online conference content while providing capability to simultaneously revisit prior section content of the online conference content. In one embodiment, a participant instructs the user interface to revisit a section of the online conference by setting a start instruction and a stop instruction on a timeline on the participant user interface associated with the live online conference. For example, a participant positions her mouse over the timeline, which causes thumbnail images from the presentation to appear, and the participant then clicks on positions on the timeline to indicate a start position and a stop position for the revisited section. In response, the participant user interface displays a child view in which the revisited section is played. In one embodiment, the participant user interface continues to play the live online conference simultaneously with the revisited section. In such embodiment, the participant user interface has separate audio and video controls for the live online conference and the child view to enable the participant to turn off the audio for the live online conference while the revisited section content is played in the child view. The participant user interface can also include speed playback control enabling the participant to fast forward through prior section content of the online conference.

Additionally, the instructions received by the participant user interface relating to revisiting sections of the conference are monitored by a conferencing application on a server. The conferencing application monitors the instructions at time intervals that can be set by the presenter, such as, for example, every minute or every five minutes. The conferencing application uses the monitored instructions to determine revisiting statistics relating to the conference, during the live online conference. Such revisiting statistics include the number of users who have utilized or are utilizing the child view, the sections of the online conference being revisited by the participants, the number of times a prior section is revisited, and the number of participants who revisit a prior section.

The conferencing application provides feedback associated with the revisiting statistics to a presenter user interface in a useful manner for the presenter to review and adjust her presentation accordingly. In one embodiment, the presenter user interface provides the feedback in a graphical manner on a dashboard. For example, the feedback may show that a significant number of participants have reviewed a particular prior section resulting in a significant number of participants being behind in the online conference. The presenter can consider whether to take a break in her presentation to allow all participants to catch up in the conference, slow her presentation speed down, or review and provide additional content for the prior section or sections most revisited by the participants.

Aspects of the techniques disclosed herein provide various benefits over prior live online conferencing techniques and specifically address problems unique to "online" live conferences. During in-person live conferences, a presenter is typically able to see at least some of his or her audience and thus directly perceive if some or all of the audience is failing to keep up with the delivery pace of presentation, losing interest in the content, not advancing in supplemental paper (e.g., still viewing prior slides on the handout). In the "online" context, a presenter is often unable to receive this valuable feedback from participants during the presentation. One aspect of this invention addresses this issue in the online context by monitoring participant interactions, such as participants revisiting prior section content of the live online conference, to provide feedback to the presenter during the presentation. This allows the presenter to adapt the presentation in real time. For example, a presenter, in one example, discontinues his or her presentation of a current slide and says "I see that half of you are revisiting the prior slide, so let me go over that slide in a bit more detail before we continue." In this example, the presenter is able to better customize and adapt the live online conference content and ultimately provide a better experience to the participants.

One embodiment disclosed herein addresses problems that are unique to allowing participants to revisit prior content during an online conference presentation. During an in-person conference, a participant with little interest in or confused about a current discussion will ignore the presenter and focus on prior slides in a paper deck and listen for the presenter to speak key words that identify that a new, more interesting topic is being discussed. Without the ability to keep an eye/ear on the current topic of the live conference, participants are less likely to revisit prior content because catching up is difficult and content of interest could be missed. This is the case with an online conference interface that simply allows the participant to rewind without any ability to keep track of the current live conference. One aspect of this invention addresses such issues in the online conference context by allowing participants to revisit a prior section while simultaneously viewing and/or listening to the live online conference. In an example in which a live online conference has both audio and video, the user interface allows the participant to selectively turn audio or video on or off, control volume and video attributes of the live and or revisiting online conference sections. This flexible control facilitates the participant's ability to achieve his or her purpose in revisiting a prior section (e.g., listening to a missed point or avoiding current content that is not of interest). For example, the participant can revisit a prior section to watch and listen to the prior content, and mute (but still view) the live online conference. When the participant, sees the next section introduction (e.g., a section title slide) displayed in the live online conference, the participant is able to easily recognize that the next section is starting and can return to viewing only the live online conference.

In the following discussion, a general description of the system and its components is provided, followed by a discussion of the operation of the same.

As used herein, an "live online conference" is a seminar or other meeting presented live by a presenter and comprising one or more presentations of audio and/or video content that is streamed to or otherwise accessible to participants via a network-connected, processor-based computing device while the presenter is presenting the seminar, meeting or other content. For example, a live online conferences can include live web-based seminars ("live webinars"), live massive open online courses (MOOCs), or live audio/video conferences.

As used herein, a "presenter" is someone who provides, controls, or influences voice, text, video, images, or other information provided in a presentation, meeting, or other live content in a live online conference. In one example, video depicting a presenter making a speech is provided during a live online conference. In another example, a presenter controls a slide show that is displayed during a live online conference. In another example, a presenter shares his or her computer screen during a live online conference. In another example, a presenter's voice is transmitted with no video or image content. In another example, a presenter's voice is transmitted with video or image content.

As used herein, a "participant" is someone who listens to and/or views content presented in a live online conference. In one example, a participant is able to control, using a user interface that presents the content of the live online conference, playback of the live online conference, for example, by pausing, stopping, rewinding, fast-forwarding, revisiting prior sections, forwarding to next or live content segments.

As used herein, a "revisiting statistic" is a statistic relating to one or more participant user interfaces revisiting one or more past sections of a live online conference, such as a particular past section revisited by participant, multiple past sections revisited by participants, a number of times a particular past section has been revisited, and a number of participants who have revisited a past section.

As used herein, a "section" of a live online conference refers to any prior time position or time portion of a live online conference. For example, rewinding 30 seconds, revisits a prior section of the online conference 30 seconds prior to the current play position. In another example, a live online conference is segmented into discrete topical segments, e.g., section 1 is an "introduction," section 2 is a "background of the industry," and section 3 is an "overview of consumer research." In this example, a presenter designates such segments manually. In another example, segments are designated automatically based on content analysis. However designated, the participants' user interfaces identify prior individual sections for the participant to revisit during the live online presentation. In one example, during a live presentation of the "overview of consumer research" segment, a participant selects a user interface command to revisit the prior section relating to "background of the industry."

As used herein, a "timeline" is a data or graphical representation of one or more events arranged chronologically in relation to the time at which the events occurred. For example, a timeline can be used to relate content of a live online conference to the particular time at which the content was presented during the online conference.

Figure 1:
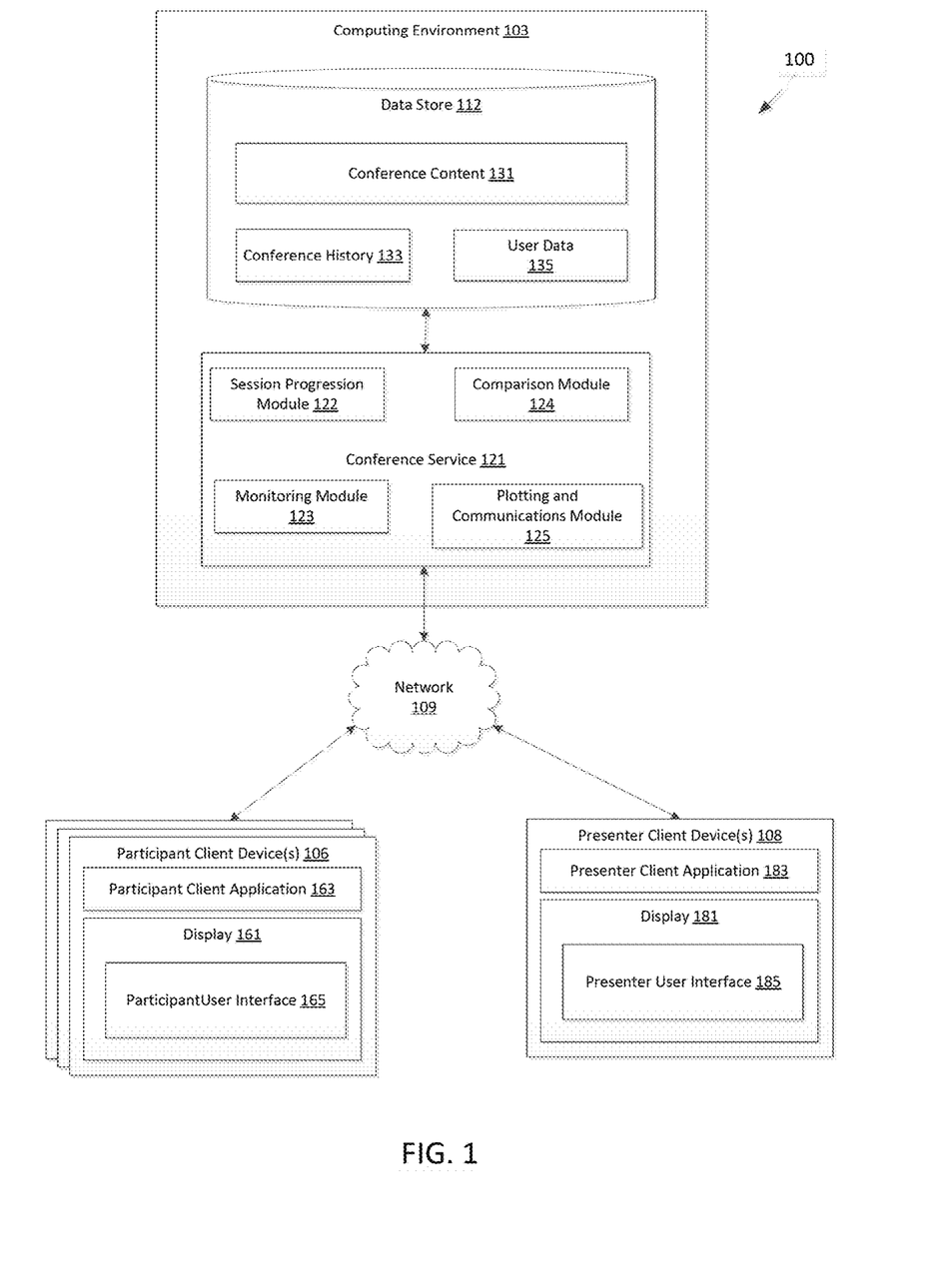
FIG. 1 is a drawing of a networked environment according to various embodiments of the present disclosure.

With reference to FIG. 1, shown is an illustrative networked environment 100 according to various embodiments. The networked environment 100 includes a computing environment 103, a presenter client device 104, and participant client devices 106, which are in data communication with each other via a network 109. The network 109 includes, for example, the Internet, intranets, extranets, wide area networks (WANs), local area networks (LANs), wired networks, wireless networks, other suitable networks, or any combination of two or more such networks. For example, such networks may comprise satellite networks, cable networks, Ethernet networks, and other types of networks. Although the functionality described herein is shown in the context of the networked environment 100, other implementations are possible, such as implementing the functionality in a single computing device (e.g. desktop computer or mobile device), as a plug-in or auxiliary feature of another service executed in a computing device, and/or in arrangements of computing devices other than those shown in FIG. 1.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a conference service 121, and other applications, services, processes, systems, engines, or functionality not discussed in detail herein. The conference service 121 is executed to facilitate a live online conference between a presenter and various participants via the network 109, as well as correlate any differential between a presenter's content delivery rate and participants' content consumption rate during the live online conference.

The conference service 121 includes a session progression module 122, a monitoring module 123, a comparison module 124, and a plotting and communications module 125. The session progression module 122 begins the monitoring and data acquisition process once the live online conference begins. After the live online conference begins, the session progression module 122 calls the monitoring module 123, which monitors content of the live online conference being presented by the presenter and being consumed via the participant user interfaces. In one example, monitoring the live online conference being consumed involves receiving messages identifying a playback time position of each participant and/or receiving messages identifying that a participant has used a particular playback command, e.g., revisit prior section. In another example, monitoring the live online conference being consumed involves querying the participants and receiving responses. In one embodiment, live online conference consumption is monitored for fixed time intervals, such as every one minute or every five minutes. In another example, the monitoring module 123 monitors when a participant user interface invokes a multi-view format and the content being consumed in the multi-view format.

The comparison module 124 determines revisiting statistics associated with prior section content being viewed in the participant user interfaces and the live online conference content. The comparison module 124 uses analytics and predetermined parameters to determine whether a determined revisiting statistic is significant. The plotting and communication module 125 receives information from the comparison module 124 and provides feedback, such as in the form of a visualization of determined revisiting statistics, to the presenter user interface while the presenter continues to present the live online conference.

The data stored in the data store 112 includes, for example, conference content 131, conference history 133, user data 135, and potentially other data. The conference content 131 includes the various content presented during the course of one or more live online conferences, as well as metadata associated with the online conferences. For each live online conference, the conference content 131 includes audio/video presentation source materials (e.g. audio/video, slide presentations) and other possible data relating to the live online conference. The metadata for each online conference includes program schedules, types of content presented (e.g. audio, video, slides), topics of the content, identifiers for presenters of conference content, a list of participants present during the online conference and times for which they were present, a timeline relating conference content to the time at which the content was presented, time intervals in which the conference was interrupted (e.g. for breaks), and/or other possible metadata.

The conference history 133 includes a history of determined differentials at various time intervals between a presenter's content delivery rate and participants' content consumption rate of the live online conference facilitated by the conference service 121. For example, the conference history 133 may include the revisiting statistics and feedback associated with the live online conference.

The user data 135 includes various data associated with presenters and participants in live online conferences facilitated by the conference service 121. The user data 135 may include user credentials and/or other user identifiers, identifiers of live online conferences in which the presenter presented or participants were present, preferences, and/or other possible data.

The participant client devices 106 and presenter client device 108 are representative of a plurality of client devices that can be coupled to the network 109. The participant client devices 106 and presenter client device 108 each comprises, for example, a processor-based system such as a computer system (e.g. desktop or laptop computer, computing tablet, smartphone). The participant client devices 106 and presenter client device 108 each includes a display 161 and 181 respectively, such as a liquid crystal display (LCD) or other type of display device.

The participant client device 106 may be configured to execute various applications such as a participant client application 163 and/or other applications. The participant client application 163 may be executed in a participant client device 106, for example, to access network content served up by the computing environment 103 and/or other servers, thereby rendering a participant user interface 165 on the participant display 161. To this end, the participant client application 106 may comprise, for example, a browser, or a dedicated application such as an online conference application, and the participant user interface 165 may comprise a network content page, or an application screen. The participant client device 106 may be configured to execute applications beyond the participant client application 163 such as, for example, email applications, social networking applications, word processors, spreadsheets, and/or other applications.

The presenter client device 108 may be configured to execute various applications such as a presenter client application 183 and/or other applications. The presenter client application 183 may be executed in a presenter client device 108, for example, to access network content served up by the computing environment 103 and/or other servers, thereby rendering a presenter user interface 185 on the presenter display 181. To this end, the presenter client application 108 may comprise, for example, a browser, a dedicated application such as an online conference application, and the presenter user interface 185 may comprise a network content page, and an application screen. The presenter client device 108 may be configured to execute applications beyond the presenter client application 183 such as, for example, email applications, social networking applications, word processors, spreadsheets, and/or other applications.

Next, a general description of the operation of the various components of the networked environment 100 is provided. To begin, a presenter operating the presenter client device 108 employs the presenter client application 183 to establish a communication session with the conference service 121. The communication session may be carried out using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109. In some implementations, the presenter is authenticated to the conference service 121 using one or more user credentials.

Figure 2:
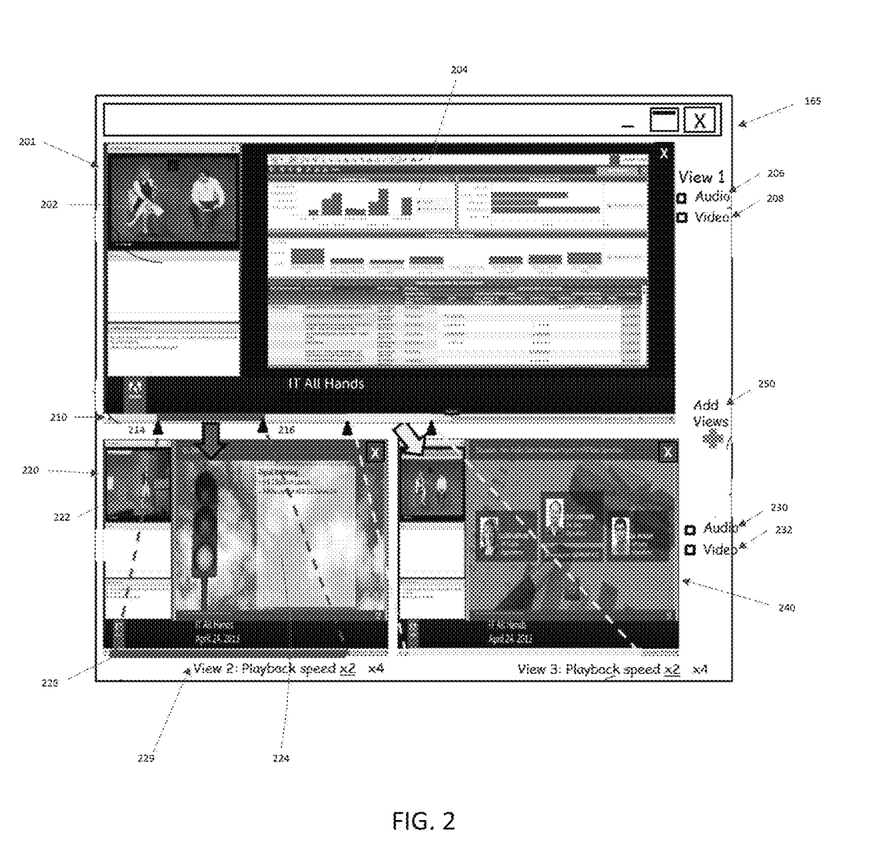
FIG. 2 is a pictorial diagram of an exemplary participant user interface rendered in a participant client in the networked environment of FIG. 1 according to various embodiments of the present disclosure.

Thereafter, participants who are attending a live online conference by the presenter are presented with a participant user interface 165, such as shown in FIG. 2, for the client application 163. One or both of the presenter client application 183 and the participant client application 163 can be Adobe Connect, GoToMeeting, or other online conferencing solutions. During the live online conference, various aural and/or visual content may be presented by one or more presenters and received by the various participants via the participant client application 163. The live visual content for the currently in-process live online conference including, for example, presentation slides, still images, and/or video can be presented in the primary view panel 201. The primary view panel 201 can include a live video feed portion 202 showing the presenter or presenters, for example, and can include a presentation material portion 204 in which presentation materials are displayed. The primary view panel also includes a presentation progress indicator 210 such as a progress bar.

A participant interacts with the presentation progress indicator 210 in order to specify a past section of the live online presentation for display in the participant user interface 165. For example, a participant provides instructions to set a start point marker 214 and an end point marker 216 on the presentation progress indicator 210. When these instructions are received, the presentation user interface displays a child view panel or secondary view panel 220. The secondary view panel 220 displays the prior section content specified by the participant instructions. Similar to the primary view panel 201, the secondary view panel 220 can include a video feed portion 222 showing the presenter or presenters and can include a presentation material portion 224 in which presentation materials are displayed. The secondary view panel 220 also includes a presentation progress indicator 228, which indicates the progress of the past section being viewed. The playback speed of the prior section is controlled by the playback speed controller 229. In one embodiment, a participant can select to increase the playback speed of the past section content, such as, for example, by two times or four times, which allows a user to catch up to the live presentation faster than playing the prior section content at normal speed.

The secondary view panel 220 displays the prior section content while the primary view panel 201 continues to display the live online presentation content. The participant user interface 165 includes audio control 206 and video control 208 for the primary view panel 201 and audio control 230 and video control 232 for the secondary view panel 220 allowing a participant to configure the audio and video for the live online presentation content and the prior section content. For example, via the controls 206, 208, 230, and 232 a participant can turn off the audio and/or video feed for the live online presentation content and/or the prior section content. The participant user interface 165 can display multiple secondary view panels. For example, the participant user interface 165 shown in FIG. 2 includes a second secondary view panel 240. Additionally, the participant user interface 165 can include a button 250 through which additional views can be added.

In order to evaluate any differential between a presenter's content delivery rate and participants' content consumption rate during the live online conference, each instance of the participant user interface 165 can monitor and collect data on various aspects of the participant user interface 165. This participant user interface data is provided to the conference service 121 on computing environment 103 as shown in FIG. 3.

Figure 3:
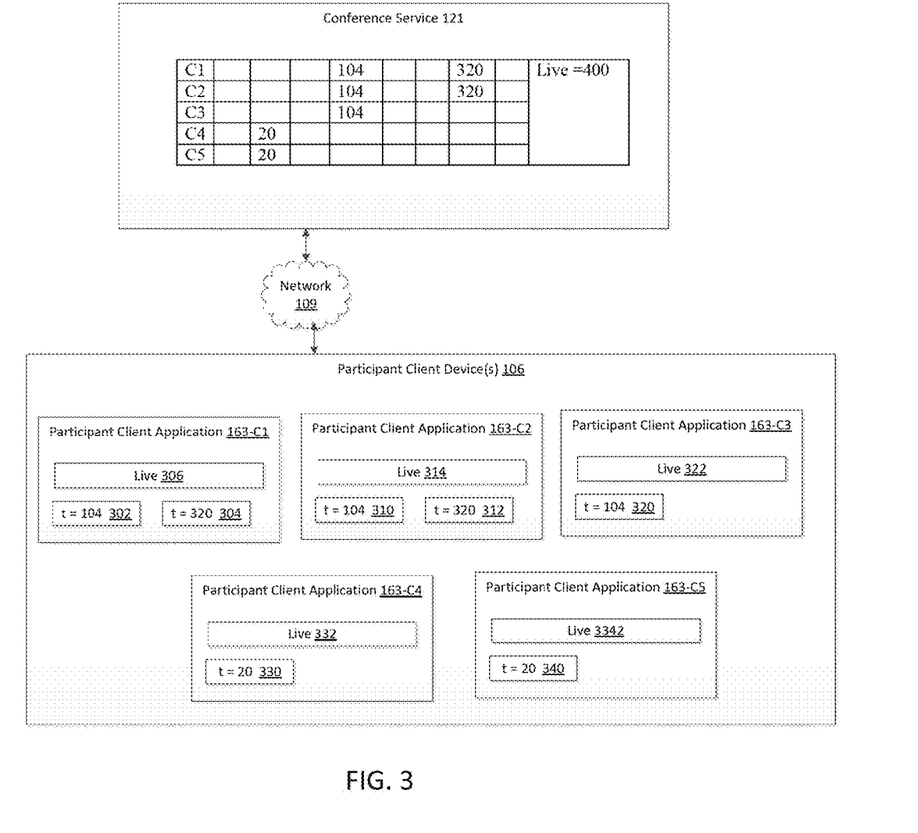
FIG. 3 is a diagram illustrating exemplary workflow and data transmissions between clients and a server in the networked environment of FIG. 1 according to various embodiments of the present disclosure.

FIG. 3 illustrates an exemplary conceptual workflow and data transmission between participant client applications 163-C1 through 163-C5 on client devices 106-C1 through 106-C5 to conference service 121 on computing environment 103. According to the example in FIG. 3, the participant client application 163-C1 received instructions 302 to play a first prior section beginning at time t=104 and instructions 304 to play a second prior section at time t=320, while still providing the live online conference 306. Similarly, the participant client application 163-C2 received instructions 310 to play a first prior section beginning at time t=104 and instructions 312 to play a second prior section at time t=320, while still providing the live online conference 314, and, the participant client application 163-C3 received instructions 320 to play a first prior section beginning at time t=104, while still providing the live online conference 322. Participant client applications 163-C4 and 163-C5 were late to join the live online presentation. As a result, participant client application 163-C4 includes instructions 330 to begin the live online conference 332 at time t=20 and participant client application 163-C5 includes instructions 340 to begin the live online conference 342 at time t=20.

The instructions 302, 304, 310, 312, 320, 330 and 340 received at the participant client applications 163-C1 through 163-C5 are received by the conference service 121 via the network 109 where they are monitored by the monitoring module 123. The instructions 302, 304, 310, 312, 320, 330 and 340 are used by the comparison module 124 and the plotting and communications module 125 to generate revisiting statistics and provide the presenter user interface 185 with feedback such as in the form of a presentation differential chart 401 shown in FIG. 4. Further, the instructions 302, 304, 310, 312, 320, 330 and 340 can be stored as conference history 133 in the data store 112 (shown in FIG. 1).

Figure 4:
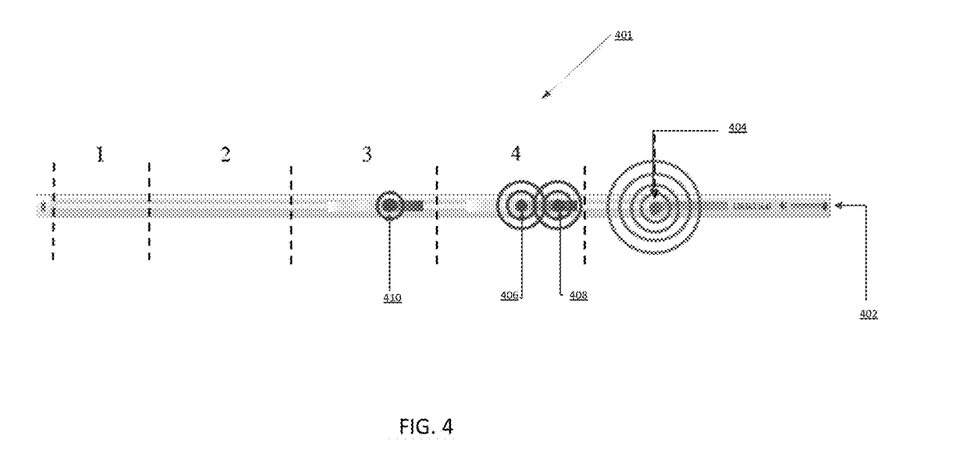
FIG. 4 is a pictorial diagram of an exemplary presentation differential chart rendered in a presenter user interface of a presenter client in the networked environment of FIG. 1 according to various embodiments of the present disclosure.

FIG. 4 illustrates a presentation differential chart 401 providing feedback based on a further example of revisiting statistics to the presenter user interface 185 during the live online conference. The feedback includes a visual display of revisiting statistics. The presentation differential chart 401 provides a timeline 402 of the live online conference with a current live position marker 404 that provides the current live position on the timeline 402 of the online conference. Additionally, the chart 401 can be divided into portions, as shown in FIG. 4 wherein the presentation has portions 1, 2, 3, and 4 shown. The chart 401 also provides markers indicating revisited prior sections of the online conference presentation. For example, the chart 401 includes three prior section markers 410, 406, and 408. The prior sections markers 410, 406, and 408 illustrate that participant user interfaces 165 have revisited these prior section. The shade of the timeline around a prior section marker indicates the frequency by which the specific content is revisited. For example, the timeline 402 is dark around the first prior section marker 410 and the third prior section marker 408 indicating that the first and third prior sections have been frequently revisited. In this embodiment, the darker color on the timeline indicates that the content around the marker is difficult and participants are revisiting this section repeatedly in order to better understand the content presented in this prior section. Although not shown in FIG. 4, the chart 401 can also display late starting marker illustrating that participant user interfaces started the program late at certain points.

The live position marker 404 is displayed differently, such as lighter lines, than the prior section makers 410, 406 and 408, which are displayed in darker lines. The live position marker 404 can also be displayed in a color, such as green, and the prior section markers 410, 406 and 408 can be displayed in another color, such as red.

The concentric circles around each marker indicate the quantity of attendees at the markers. For example, more concentric circles around first prior section marker 406 than second prior section marker 408 indicate that more participants viewed the first prior section than the second prior section via the participant user interfaces 165. In the example of FIG. 3, the concentric circles around the live position marker 404 indicate a significantly higher count of users viewing the live view than the prior section markers 410, 406 and 408. The first prior section marker 410 only has one circle associated with it and the second prior section marker 406 and the third prior section marker 408 each have two associated circles. In this example, this indicates that more participants viewed prior sections 406 and 408 than prior section 410. A presenter uses the feedback associated with the revisiting statistics provided by the presentation differential chart 401 during the live online conference to make decisions regarding the speed of content delivery and whether to present additional material on prior sections. The feedback is highly efficient in enabling the presenter to generally determine the rate of differentials between the conference content delivery versus content consumption by the participants. Additionally, such feedback represents high business value because it enables a presenter to: gauge the difficulty level of online conference content as perceived by the participants; evaluate and control the delivery speed of the conference content as per the participant's consumption of the conference content; take any contextual decisions enabling attendees requiring additional time for the conference content or revisit a prior section in a seamless and non-intrusive manner. This results into enhancing the effectiveness and participation in a live online conferencing sessions for both presenter as well as participants. For example, with the feedback provided by the presentation differential chart 401, a presenter could decide during the live online conference to go back and provide additional content on portions 3 and 4 of the online conference or could decide to provide additional content associated only with prior sections 406 and 408.

Figure 5:
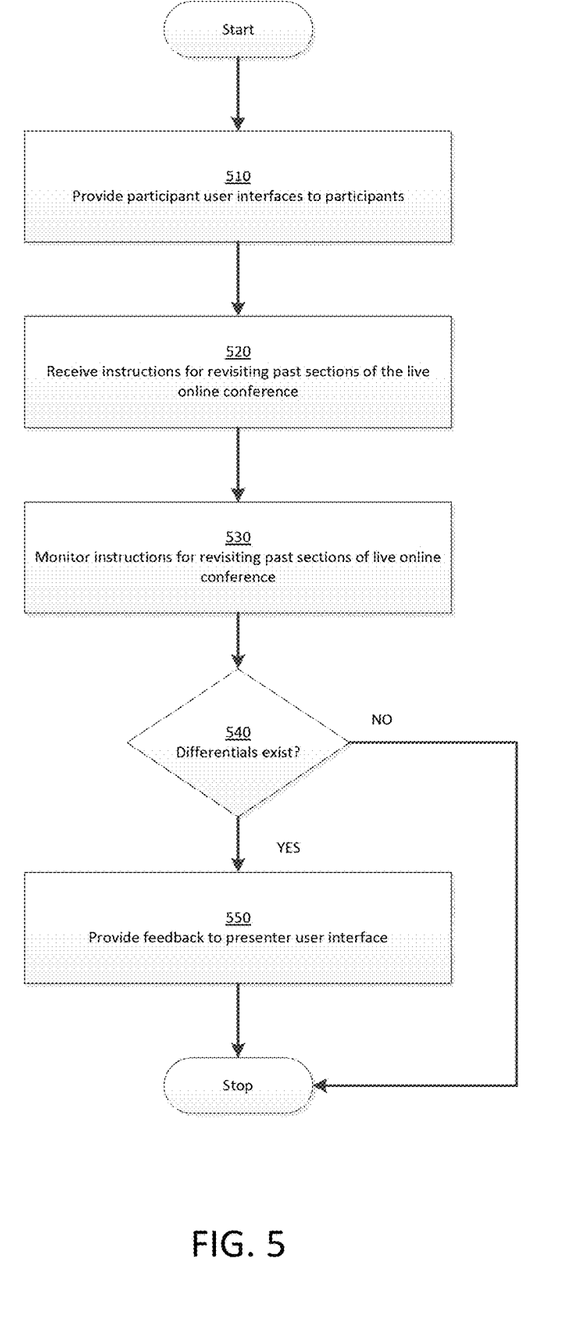
FIG. 5 is a flowchart illustrating an example of functionality implemented as portions of the live online conference service execute in a computing environment in the networked environment of FIG. 1 according to various embodiments of the present disclosure.

Referring next to FIG. 5, shown is a flowchart that provides one example of the operation of a portion of the conference service 121 according to various embodiments. It is understood that the flowchart of FIG. 5 provides merely an example of the many different types of functional arrangements that may be employed to implement the operation of the portion of the conference service 121 as described herein. As an alternative, the flowchart of FIG. 5 may be viewed as depicting an example of elements of a method implemented in the computing environment 103 according to one or more embodiments. The portion of the operation of the conference service 121 depicted in FIG. 5 may be initiated in response to receiving a request from the presenter client application 168, via an established communication session, to obtain feedback based on revisiting statistics, such as the feedback shown in the exemplary presentation differential chart of FIG. 4.

In the example illustrated in FIG. 5, a presenter presents a live online conference to participants viewing and listening to the live online conference via a live online conferencing solution, such as Adobe Connect and GoToMeeting. For example, one or more presenters can present an online conference to 200 participants, with each participant viewing and listening to the live online conference via a participant user interface. The presenter presents the conference content at a certain pace and utilizes a presenter user interface to receive feedback on the participants' conference content consumption rate.

Beginning with block 510, each participant is provided with a participant user interface 165 for display on a participant client device 106. The participant user interfaces, such as participant user interface 165 shown in FIG. 2, include a primary view panel that presents the live online conference and one or more secondary view panels that display prior sections specified by participant instructions.

At block 520, the instructions provided at the participant user interface 165 to revisit past sections of the online conference are received by the monitoring module 123 of the conference service 121. Due to each participants variation in knowledge base and ability to grasp the presented content, certain participants begin to revisit past sections of the online conference content by providing instructions to the participant user interface 165. In one embodiment, the participant user interface provides an audio and video replay of past sections of the online conference content while simultaneously presenting the live online conference content.

Next, at block 530, the received instructions to revisit past sections are monitored by the monitoring module 123 of the conference service 121. For example, the monitoring module 123 maps the live conference content delivered by the conference service 121 and the prior session content requested by the participant user interfaces at fixed time intervals. The time intervals can be, for example, every certain number of minutes, such as every minute or every five minutes. The monitoring module 123 also logs the number of participants revisiting prior sections and number of revisits of prior sections. Additionally, the monitoring module can monitor the current status of the live online presentation.

Then, at block 540, the comparison module 124 of the conference service 121 determines a revisiting statistic based on the monitored instructions. For example, the comparison module 124 compares at each timestamp or fixed time interval the live online conference content with the past section content currently being consumed to determine one or more revisiting statistics. The revisiting statistics include one or more of the a particular past section revisited by participants, multiple past sections revisited by participants, a number of times a particular past section has been revisited, and a number of participants who have revisited a past section. Since the conference online conference is live, a participant cannot move ahead of the live conference content. A participant user interface can only present live conference content and prior section content.

Finally, at block 550, the plotting and communications module 125 provides feedback to the presenter user interface based on the revisiting statistic. In one embodiment, a revisiting statistic or multiple revisiting statistics are provided by the comparison module 124 to the plotting and communications module 125. In such embodiment, the plotting and communications module 125 segregates the entire participants revisiting statistics into three main categories: participant user interfaces running in congruence with presenter's delivery of conference content; participant user interfaces lagging behind with that of presenter's delivery of conference content; and prior section content that users are re-visiting and trying to understand more (one time or more than once). The plotting and communications module 125 can present feedback associated with the revisiting statistic or statistics in the presenter user interface 185.

In one embodiment, the plotting and communications module 125 provides a two-dimensional representation of the feedback associated with the revisiting statistics by plotting on a chart, such as a presentation differential chart 401 shown in FIG. 4.

Figure 6:
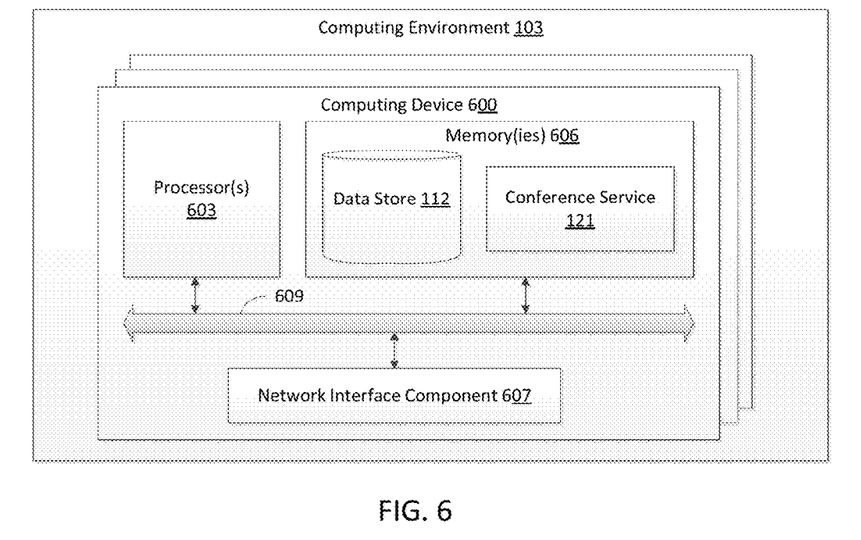
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a conference application 121, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606. The local interface 609 may comprise additional systems designed to coordinate this communication, including, for example, performing load balancing. The processor 603 may be of electrical or of some other available construction.

Although the conference service 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The flowcharts of FIG. 5 show the functionality and operation of an implementation of portions of the conference service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code. If embodied in hardware, each block may represent a circuit or a number of interconnected circuits to implement the specified logical function(s).

Although the flowchart of FIG. 5 show a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

Also, any logic or application described herein, including the conference service 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the conference service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item or term may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. In an environment in which a live online conference is distributed through a computer network to participant user interfaces, a method for providing feedback to a presenter user interface based on participants revisiting prior section content of the live online conference during the live online conference, the method including a computing system performing operations comprising:
providing the participant user interfaces to the participants, wherein the participant user interface receives instructions causing the participant user interface to revisit prior section content of the live online conference during the live online conference;

monitoring the instructions causing participant user interfaces to revisit prior section content during the live online conference;

based on the monitoring of the instructions, determining a revisiting statistic regarding the participant user interfaces revisiting the prior section content; and providing feedback based on the revisiting statistic to the presenter user interface, wherein providing the feedback comprises providing a graphical representation of a timeline of the live online conference comprising:

a current live position marker that provides a current live position on the timeline of the live online conference; and markers positioned on the timeline indicating revisited prior sections of the live online conference, wherein size, shape, shade, or color characteristics of the markers graphically depict amounts or frequencies of participants revisiting respective prior sections of the live online conference, wherein the graphical representation of the timeline changes during the live online conference based on changes to the live position marker and changes to the markers positioned on the timeline.

2. The method of claim 1, wherein the revisiting statistic comprises a particular prior section.

3. The method of claim 1, wherein the revisiting statistic comprises multiple prior sections.

4. The method of claim 1, wherein the revisiting statistic comprises a number of times particular prior section content has been revisited.

5. The method of claim 1, wherein the revisiting statistic comprises a number of participants who have revisited particular prior section content.

6. The method of claim 1, wherein providing feedback comprises creating a visual display of the revisiting statistic.

7. The method of claim 6, wherein the visual display displays an indication of a revisited prior section, a number of times revisited prior section content has been revisited, and a number of participants who have revisited particular prior section content.

8. The method of claim 1, wherein the participant user interface simultaneously displays prior section content and live online conference content.

9. The method of claim 1, wherein instructions are monitored at fixed time intervals.

10. A computing system comprising:
a processing device; and
a non-transitory computer-readable medium communicatively coupled to the processing device, wherein the processing device is configured to perform operations comprising:
providing participant user interfaces to participants, wherein the participant user interface displays live online conference content;
receiving instructions to revisit prior section content of a live online conference during the live online conference;
based on the instructions, simultaneously displaying the prior section content and the live online conference content;
monitoring the instructions causing the participant user interfaces to revisit the prior section content during the live online conference;
based on the monitoring of the instructions, determining a revisiting statistic regarding the participant user interfaces revisiting the prior section content; and
providing feedback based on the revisiting statistic to a presenter user interface, wherein providing the feedback comprises providing a graphical representation of a timeline of the live online conference comprising:
a current live position marker that provides a current live position on the timeline of the live online conference; and
markers positioned on the timeline indicating revisited prior sections of the live online conference, wherein size, shape, shade, or color characteristics of the markers graphically depict amounts or frequencies of participants revisiting respective prior sections of the live online conference.

11. The computing system of claim 10, wherein the participant user interface has separate audio or video controls for controlling audio or video associated with the prior section content and the live online conference content.

12. The computing system of claim 10, wherein the participant user interface simultaneously presents video associated with the prior section content and the live online conference content while only presenting audio from one of the prior section content or the live online conference content.

13. The computing system of claim 10, wherein the presenter user interface comprises:
a first graphic indicating a first portion of the timeline associated with the prior section content; and
a second graphic indicating a second portion of the timeline associated with the live online conference content.

14. The computing system of claim 10, wherein the instructions are monitored at fixed time intervals.

15. The computing system of claim 10, wherein providing the feedback comprises creating a visual display of the revisiting statistic.

16. The computing system of claim 15, wherein the visual display displays an indication of a revisited prior section, a number of times revisited prior section content has been revisited, and a number of participants who have revisited particular prior section content.

17. A non-transitory computer-readable medium having instructions stored thereon, the instructions executable by a processing device to perform operations comprising:
providing participant user interfaces to participants, wherein the participant user interfaces display live online conference content;
receiving instructions to revisit prior section content of a live online conference during the live online conference;
based on the instructions, simultaneously displaying, by a computer, the prior section content and the live online conference content;
monitoring the instructions causing the participant user interfaces to revisit the prior section content during the live online conference;
based on the monitoring of the instructions, determining, by a computer, a revisiting statistic regarding the participant user interfaces revisiting the prior section content; and
providing feedback based on the revisiting statistic to a presenter user interface, wherein providing the feedback comprises providing a graphical representation of a timeline of the live online conference comprising:

a current live position marker that provides a current live position on the timeline of the live online conference; and a visual display of the revisiting statistic positioned on the timeline, wherein the graphical representation of the timeline changes during the live online conference based on changes to the live position marker and changes to the visual display of the revisiting statistic positioned on the timeline.

18. The non-transitory computer-readable medium of claim 17, wherein the visual display of the revisiting statistic comprises markers indicating revisited prior sections of the live online conference, wherein size, shape, shade, or color characteristics of the markers graphically depict amounts or frequencies of participants revisiting respective prior sections of the live online conference.

* * * * *